Patented Apr. 5, 1949

2,466,419

UNITED STATES PATENT OFFICE 2,466,419

β,β'-OXYDIPROPIONIC ACIDS AND PROCESS OF PREPARATION

Hugh J. Hagemeyer, Jr., Kingsport, Tenn., assignor to Eastman Kodak Company, Rochester, N. Y., a corporation of New Jersey No Drawing. Application February 7, 1948, Serial No. 6,985

16 Claims. (Cl. 260—535)

This invention relates to β,β'-oxydipropionic acids, and more particularly to a process for preparing such acids.

It is known that β-hydroxypropionic acids can be prepared by the hydrolysis of one molecular equivalent of a β-lactone with one molecular equivalent of water. This hydroxy acid can then be dehydrated to give an α,β-unsaturated carboxylic acid. Kung U. S. Patent 2,361,036, dated October 24, 1944. As has been observed, however, this method does not give good yields of the desired products, partly because the lactones are unstable compounds, and partly because of their tendency to polymerize under the conditions used in the hydrolysis.

Whereas the prior art shows that β-hydroxypropionic acids are produced when one molecular equivalent of a β-lactone is hydrolyzed with one molecular equivalent of water, and then only with considerable difficulty, I have found that when two or more molecular equivalents of a β-lactone are reacted with one molecular equivalent of water, β,β'-oxydipropionic acids can be produced in good yields.

Accordingly, an object of my invention is to provide a process for preparing β,β'-oxydipropionic acids. A further object of my invention is to provide a process for preparing new β,β'-oxydipropionic acids. Other objects will become apparent from a consideration of the following description.

These objects are accomplished by the discovery that when at least 2 molecular equivalents of a β-lactone react with one molecular equivalent of water, a β,β'-oxydipropionic acid is produced in good yield. Advantageously, my new process can be performed by reacting from 2 to 6 molecular equivalents of a β-lactone with one molecular equivalent of water, although larger amounts of β-lactone can be used, if desired.

The β-lactones which can advantageously be used in practicing my invention can be represented by the formula:

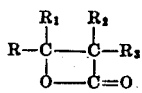

wherein R, R₁, R₂ and R₃ each represents a member selected from the group consisting of a hydrogen atom, an alkyl group, such as methyl, ethyl, propyl, isopropyl, n-butyl, isobutyl, etc. (i. e. especially an alkyl group having the formula $C_nH_{2n+1}$ wherein $n$ is a positive integer from 1 to 4), and an aryl group, such as phenyl, m- and p-tolyl, etc. Typical β-lactones include: β-propionolactone, β-butyrolactone, β-methyl-β-butyrolactone, β-phenyl-β-propionolactone, β-phenyl-β-butyrolactone, etc. These β-lactones can conveniently be prepared by reacting a ketene (both aldo and keto ketenes) with an aldehyde or ketone in the presence of a catalyst, such as boric acid, an ester of boric acid, or an acylated boric acid, etc. Such a process is disclosed in my copending application, Serial No. 660,287, filed on April 6, 1946. Kung U. S. Patent 2,356,459, dated August 22, 1944, also describes a process whereby the β-lactones, which can advantageously be used in practicing the process of the present invention, can be used.

When at least 2 molecular equivalents of a β-lactone react with one molecular equivalent of water in accordance with the process of my invention, the reaction can be considered as proceeding as indicated by the equation:

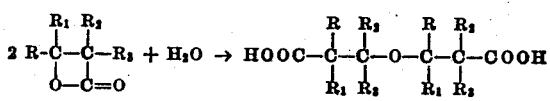

wherein R, R₁, R₂ and R₃ each have the meanings set forth above. The process is advantageously carried out in the absence of a catalyst, since acidic or basic type catalysts have a deleterious effect on the direction and yields of the process.

The temperature at which the process of my invention is practiced can be varied according to the type of β-lactone being used. Care should be taken to avoid too rapid a rise in temperature, since β-lactones are known to lose carbon dioxide readily with the formation of unsaturated compounds. Generally, a temperature of from 20 to 130° C. can be used. Advantageously, a more limited range of from 60 to 100° C. can be used. Lower temperatures (e. g. about 10° C.) can be used, although there is ordinarily no advantage in doing so. Temperatures lower than about 20° C. are somewhat less advantageous since the speed of reaction decreases at these temperatures.

The water can be added to the β-lactone and the mixture then heated until the reaction is complete, or a more convenient method comprises heating the β-lactone to about 70° C. and then adding the water gradually. This later procedure has the advantage of providing a more accurate means for controlling the temperature of the reaction, since the reaction between β-lactones and water becomes exothermic when a temperature of about 70° C. has been reached. Thus, by first heating the β-lactone to about 70° C. or higher, the water can then be added slowly and in such a manner as to avoid too rapid a rise in temperature once the reaction has begun.

Inert solvents which are water-soluble, and are a solvent for the β-lactone, can be used if desired. Such solvents as acetone, methyl ethyl ketone, 1,4-dioxane, etc. are especially useful.

The β,β'-oxydipropionic acids produced in accordance with the process of my invention can conveniently be separated from the reaction mixture by distillation under vacuum. The distillation should be carried out at temperatures not in excess of about 250° C., although most advantageous yields are obtained when the distillation temperature does not exceed about 200° C. Many of the higher molecular weight acids produced in my process are insoluble in water, and can be separated by decantation, centrifugation, etc. Alternatively, they can be extracted with a water-immiscible organic solvent, or separated as a water-insoluble salt, followed by acidification.

The following examples will serve to illustrate further the manner of practicing the process of my invention.

*Example I.—β,β'-oxydipropionic acid (dihydracrylic acid)*

HOOC—CH$_2$—CH$_2$—O—CH$_2$—CH$_2$—COOH 144 parts by weight of β-propionolactone were stirred and heated to 90 to 110° C. While maintaining the temperature within this range, 18 parts by weight of water were added dropwise. The reaction was exothermic, and the temperature was controlled by the rate of addition of the water. After all of the water had been added, the vessel containing the reaction mixture was equipped with a reflux condenser, and the solution was heated at 90 to 100° C. for about 12 hours. The reaction mixture was then distilled under a vacuum, and 82 parts by weight of a fraction boiling at 198 to 200° C./1 to 2 mm. was collected. This material was found to have an equivalent weight of 82.9, while the equivalent weight calculated for β,β'-oxydipropionic acid is 81. On standing, the liquid distillate crystallized to a solid melting at 58° C.

When a molecularly equivalent amount of β-phenyl-β-propionolactone (prepared according to the method described in Serial No. 660,287) replaces the β-propionolactone in the above example, β,β'-oxydi-(β-phenylpropionic) acid represented by the formula:

HOOC—CH$_2$—CH—O—CH—CH$_2$—COOH can be obtained in excellent yield. In a like manner when β-caprolactone is substituted in the above example in a molecularly equivalent amount, β,β'-oxydicaproic acid represented by the formula:

$$\text{HOOC—CH}_2\text{—CH—O—CH—CH}_2\text{—COOH}$$
with C$_3$H$_7$ substituents can be obtained.

*Example II.—β,β'-oxydipropionic acid (dihydracrylic acid)*

HOOC—CH$_2$—CH$_2$—O—CH$_2$—CH$_2$—COOH 144 parts by weight of β-propionolactone were dissolved in 300 cc. of methyl ethyl ketone, and the solution placed in a flask equipped with a reflux condenser and a dropping funnel. The solution was then heated to gentle reflux (about 80° C.), and 18 parts by weight of water were added dropwise over a period of 2 hours. The reaction mixture was then distilled under a vacuum, and the fraction boiling at 198 to 200° C./1 to 2 mm. collected. There were thus obtained 94 grams of β,β'-oxydipropionic acid.

When a molecularly equivalent amount of β-heptylolactone replaces the β-propionolactone in the above example, β,β'-oxydiheptylic acid represented by the formula:

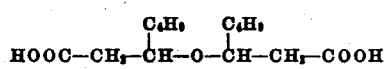

can be obtained in excellent yield. Similarly when at least 2 molecular equivalents of valerolactone are reacted with one molecular equivalent of water, β,β'-oxydivaleric acid represented by the formula:

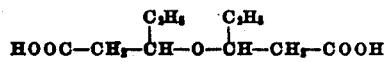

can be obtained.

*Example III.—β,β'-oxydibutyric acid*

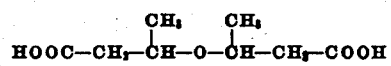

172 parts by weight of β-butyrolactone were stirred and heated to 80 to 90° C. While the temperature was maintained within this range, 18 parts by weight of water were added dropwise over a period of 2 hours. After the addition of the water was complete, the heating was continued for 14 hours. Upon distillation of the reaction mixture under a vacuum, 102 parts by weight of β,β'-oxydibutyric acid boiling at 204-6° C./1 to 2 mm. were obtained.

In a similar manner when β-methyl-β-butyrolactone replaces the β-butyrolactone of the above example in a molecularly equivalent amount, β,β'-oxydi-(β-methylbutyric) acid represented by the formula:

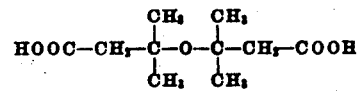

can be obtained. Similarly when a molecularly equivalent amount of β-p-tolyl-β-propionolactone represented by the formula:

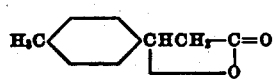

replaces the β-butyrolactone in the above example, β,β'-oxydi-(β-p-tolylpropionic) acid represented by the formula:

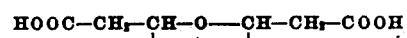
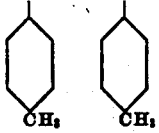

can be obtained in good yield. Likewise, when a molecularly equivalent amount of β,β-diphenyl-β-propionolactone represented by the formula:

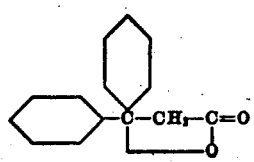

is substituted in the above example, β,β'-oxydi-(β,β-diphenyl-propionic) acid represented by the formula:

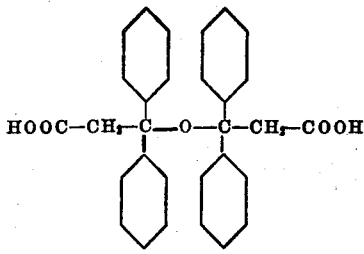

can be obtained. Operating in a similar manner, other β-lactones can be reacted with water in accordance with the process of my invention to produce still other β,β'-oxydipropionic acids. Thus, for example, when at least 2 molecular equivalents of α,α-diphenyl-β-butyrolactone (obtained by the condensation of diphenyl ketene with acetaldehyde in accordance with the process described in application Serial No. 660,287) are reacted with water, β,β'-oxydi-(α,α-diphenyl-butyric) acid represented by the formula:

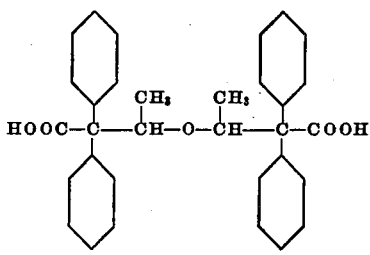

can be obtained.

The acids obtained in accordance with the process of my invention are useful in the preparation of esters and synthetic resins.

I claim:

1. A process for preparing an acid represented by the formula:

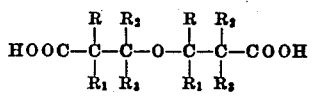

wherein R, R₁, R₂, and R₃ each represents a member selected from the group consisting of a hydrogen atom, an alkyl group, and an aryl group, which comprises reacting from 2 to 6 molecular equivalents of a lactone represented by the formula:

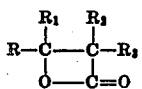

wherein R, R₁, R₂, and R₃ each represents a member selected from the group consisting of a hydrogen atom, an alkyl group, and an aryl group, with one molecular equivalent of water at a temperature of from 20 to 130° C.

2. A process for preparing an acid represented by the formula:

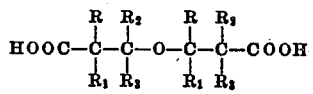

wherein R, R₁, R₂, and R₃ each represents a member selected from the group consisting of a hydrogen atom, an alkyl group, and an aryl group, which comprises reacting from 2 to 6 molecular equivalents of a lactone represented by the formula:

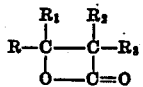

wherein R, R₁, R₂, and R₃ each represents a member selected from the group consisting of a hydrogen atom, an alkyl group, and an aryl group with one molecular equivalent of water at a temperature of from 60 to 100° C.

3. A process for preparing an acid represented by the formula:

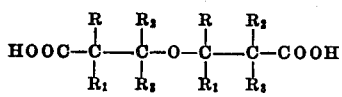

wherein R, R₁, R₂, and R₃ each represents a member selected from the group consisting of a hydrogen atom, an alkyl group, and an aryl group, which comprises reacting from 2 to 6 molecular equivalents of a lactone represented by the formula:

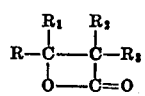

wherein R, R₁, R₂, and R₃ each represents a member selected from the group consisting of a hydrogen atom, an alkyl group, and an aryl group, with one molecular equivalent of water at a temperature of from 20 to 130° C. in the presence of a solvent selected from the group consisting of acetone, methyl ethyl ketone, and dioxane.

4. A process for preparing β,β'-oxydipropionic acid represented by the formula:

HOOC—CH₂—CH₂—O—CH₂—CH₂—COOH which comprises reacting from 2 to 6 molecular equivalents of β-propionolactone represented by the formula:

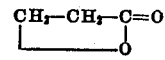

with one molecular equivalent of water at a temperature of from 20 to 130° C.

5. A process for preparing β,β'-oxydipropionic acid represented by the formula:

HOOC—CH₂—CH₂—O—CH₂—CH₂—COOH which comprises reacting from 2 to 6 molecular equivalents of β-propionolactone represented by the formula:

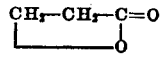

with one molecular equivalent of water at a temperature of from 60 to 100° C.

6. A process for preparing β,β'-oxydipropionic acid represented by the formula:

HOOC—CH₂—CH₂—O—CH₂—CH₂—COOH which comprises reacting from 2 to 6 molecular equivalents of β-propionolactone represented by the formula:

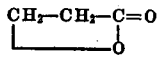

with one molecular equivalent of water at a temperature of from 60 to 100° C. in the presence of a solvent selected from the group consisting of acetone, methyl ethyl ketone, and dioxane.

7. A process for preparing an acid represented by the formula:

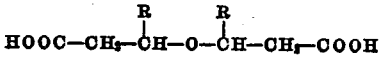

wherein R represents a primary alkyl group having from 1 to 4 carbon atoms, which comprises reacting from 2 to 6 molecular equivalents of a lactone represented by the formula:

$$R-CH-CH_2-C=O$$
$$\phantom{R-CH-}|\phantom{CH_2-}|$$
$$\phantom{R-CH-CH_2-}O$$

wherein R represents a primary alkyl group having from 1 to 4 carbon atoms with one molecular equivalent of water at a temperature of from 20 to 130° C.

8. A process for preparing an acid represented by the formula:

$$HOOC-CH_2-\underset{R}{\overset{R}{C}H}-O-\underset{}{\overset{R}{C}H}-CH_2-COOH$$

wherein R represents a primary alkyl group having from 1 to 4 carbon atoms, which comprises reacting from 2 to 6 molecular equivalents of a lactone represented by the formula:

$$R-CH-CH_2-C=O$$
$$\phantom{xxxxxx}|\phantom{xxx}|$$
$$\phantom{xxxxxxxxxx}O$$

wherein R represents a primary alkyl group having from 1 to 4 carbon atoms with one molecular equivalent of water at a temperature of from 60 to 100° C.

9. A process for preparing an acid represented by the formula:

$$HOOC-CH_2-\overset{R}{C}H-O-\overset{R}{C}H-CH_2-COOH$$

wherein R represents a primary alkyl group having from 1 to 4 carbon atoms, which comprises reacting from 2 to 6 molecular equivalents of a lactone represented by the formula:

$$R-CH-CH_2-C=O$$
$$\phantom{xxxxx}|\phantom{xxx}|$$
$$\phantom{xxxxxxxxxx}O$$

wherein R represents a primary alkyl group having from 1 to 4 carbon atoms with one molecular equivalent of water at a temperature of from 20 to 130° C. in the presence of a solvent selected from the group consisting of acetone, methyl ethyl ketone, and dioxane.

10. A process for preparing β,β'-oxydibutyric acid represented by the formula:

$$HOOC-CH_2-\overset{CH_3}{C}H-O-\overset{CH_3}{C}H-CH_2-COOH$$

which comprises reacting from 2 to 6 molecular equivalents of β-butyrolactone represented by the formula:

$$CH_3-CH-CH_2-C=O$$
$$\phantom{xxxx}|\phantom{xxxx}|$$
$$\phantom{xxxxxxxxxx}O$$

with one molecular equivalent of water at a temperature of from 20 to 130° C.

11. A process for preparing β,β'-oxydibutyric acid represented by the formula:

$$HOOC-CH_2-\overset{CH_3}{C}H-O-\overset{CH_3}{C}H-CH_2-COOH$$

which comprises reacting from 2 to 6 molecular equivalents of β-butyrolactone represented by the formula:

$$CH_3-CH-CH_2-C=O$$
$$\phantom{xxx}|\phantom{xxxx}|$$
$$\phantom{xxxxxxxxx}O$$

with one molecular equivalent of water at a temperature of from 60 to 100° C.

12. A process for preparing β,β'-oxydibutyric acid represented by the formula:

$$HOOC-CH_2-\overset{CH_3}{C}H-O-\overset{CH_3}{C}H-CH_2-COOH$$

which comprises reacting from 2 to 6 molecular equivalents of β-butyrolactone represented by the formula:

$$CH_3-CH-CH_2-C=O$$
$$\phantom{xxx}|\phantom{xxxx}|$$
$$\phantom{xxxxxxxxx}O$$

with one molecular equivalent of water at a temperature of from 20 to 130° C. in the presence of a solvent selected from the group consisting of acetone, methyl ethyl ketone, and dioxane.

13. A process for preparing an acid represented by the formula:

$$HOOC-CH_2-\overset{R_1}{C}H-O-\overset{R_1}{C}H-CH_2-COOH$$

wherein $R_1$ represents an aryl group, which comprises reacting from 2 to 6 molecular equivalents of a β-lactone represented by the formula:

$$R_1-CH-CH_2-C=O$$
$$\phantom{xxx}|\phantom{xxxx}|$$
$$\phantom{xxxxxxxxx}O$$

wherein $R_1$ represents an aryl group, with one molecular equivalent of water at a temperature of from 20 to 130° C.

14. A process for preparing an acid represented by the formula:

$$HOOC-CH_2-\overset{R_1}{C}H-O-\overset{R_1}{C}H-CH_2-COOH$$

wherein $R_1$ represents an aryl group, which comprises reacting from 2 to 6 molecular equivalents of a β-lactone represented by the formula:

$$R_1-CH-CH_2-C=O$$
$$\phantom{xxx}|\phantom{xxxx}|$$
$$\phantom{xxxxxxxxx}O$$

wherein $R_1$ represents an aryl group with one molecular equivalent of water at a temperature of from 60 to 100° C.

15. A process for preparing an acid represented by the formula:

$$HOOC-CH_2-\overset{R_1}{C}H-O-\overset{R_1}{C}H-CH_2-COOH$$

wherein $R_1$ represents an aryl group, which comprises reacting from 2 to 6 molecular equivalents of a β-lactone represented by the formula:

$$R_1-CH-CH_2-C=O$$
$$\phantom{xxx}|\phantom{xxxx}|$$
$$\phantom{xxxxxxxxx}O$$

wherein $R_1$ represents an aryl group with one molecular equivalent of water at a temperature of from 20 to 130° C. in the presence of a solvent selected from the group consisting of acetone, methyl ethyl ketone, and dioxane.

16. A process for preparing an acid represented by the formula:

$$HOOC-\underset{R_1}{\overset{R}{C}}-\underset{R_2}{\overset{R_2}{C}}-O-\underset{R_1}{\overset{R}{C}}-\underset{R_2}{\overset{R_2}{C}}-COOH$$

wherein R, $R_1$, $R_2$, and $R_3$ each represents a member selected from the group consisting of a hydrogen atom, an alkyl group, and an aryl group, which comprises reacting from 2 to 6 molecular equivalents of a lactone represented by the formula:

$$R-\underset{O}{\overset{R_1}{C}}-\underset{}{\overset{R_2}{C}}-R_3$$
$$\phantom{xxx}|\phantom{xxx}|$$
$$\phantom{xxxx}O-C=O$$

with one molecular equivalent of water.

HUGH J. HAGEMEYER, Jr.

No references cited.